United States Patent [19]
Gaser

[11] 3,977,540
[45] Aug. 31, 1976

[54] MARINE UNLOADING AND LOADING SYSTEM OF POWDERED AND LUMPY BULK MATERIALS FOR HOLDS WITH A PNEUMATIC DISCHARGE DEVICE

[75] Inventor: Ernst Gaser, Stelle, Germany

[73] Assignee: Claudius Peters AG, Hamburg, Germany

[22] Filed: Apr. 4, 1975

[21] Appl. No.: 565,053

[30] Foreign Application Priority Data
Apr. 8, 1974 Germany............................ 2417098

[52] U.S. Cl..................................... 214/14; 302/53
[51] Int. Cl.².......................................... B65G 53/04
[58] Field of Search................... 214/1 BE, 12, 14; 302/29, 53, 57

[56] References Cited
UNITED STATES PATENTS

| | | | |
|---|---|---|---|
| 2,545,766 | 3/1951 | Cline | 302/29 X |
| 2,828,163 | 3/1958 | Aller | 302/29 |

*Primary Examiner*—Robert J. Spar
*Assistant Examiner*—George F. Abraham
*Attorney, Agent, or Firm*—Otto John Munz

[57] ABSTRACT

In a marine loading system of bulky materials for ships, Barges and similar vessels, means are provided to handle either powdered materials or lumpy materials. The powdered materials are unloaded by airflotation means provided with a pneumatic discharge device having air permeable panels, individual, or foldably connected into a unit, with an air conveyer chute attached to each panel. Both the panels and the chutes are unilaterally flexible and connected to the bottom of the hold by hinges so that they may be folded upward to the vertical walls of the hold and there locked, while conventional gripping means are provided for handling the lumpy materials.

The open-air conveyer chutes function as feeders to the pneumatic conveyer units for advancing the bulk material.

The panels as well as the open air conveyer chutes are provided on their bottom sides with a steel reinforcing construction.

The air feed lines for the panels, and the open-air conveyer chutes are constructed in the hinged area as flexible, engageable lines.

In the alternative the air feeder lines for the panels, and the open air conveyer lines are constructed in the hinge areas as hinge joint.

8 Claims, 4 Drawing Figures

U.S. Patent    Aug. 31, 1976    3,977,540
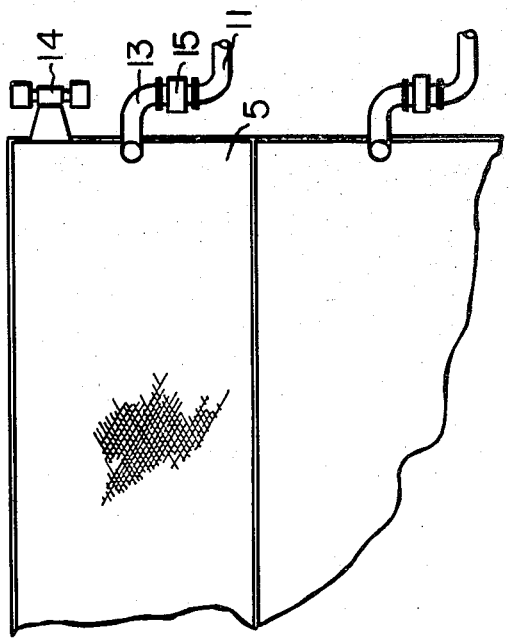
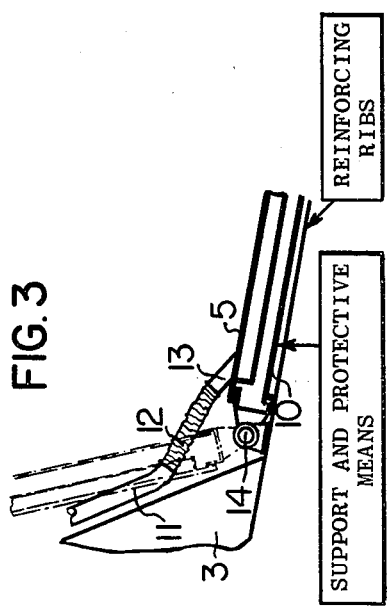
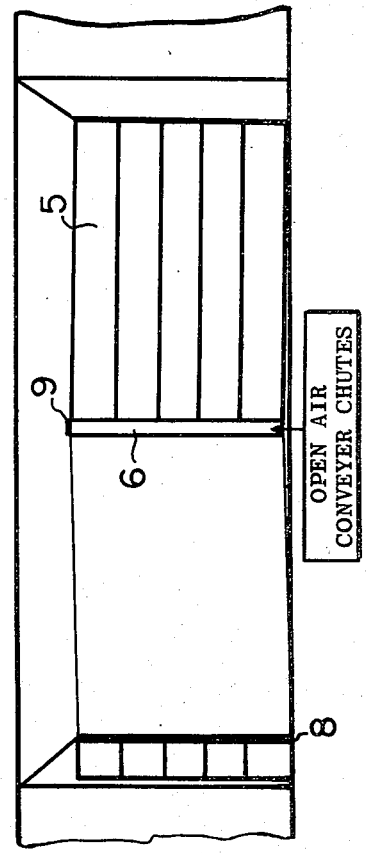
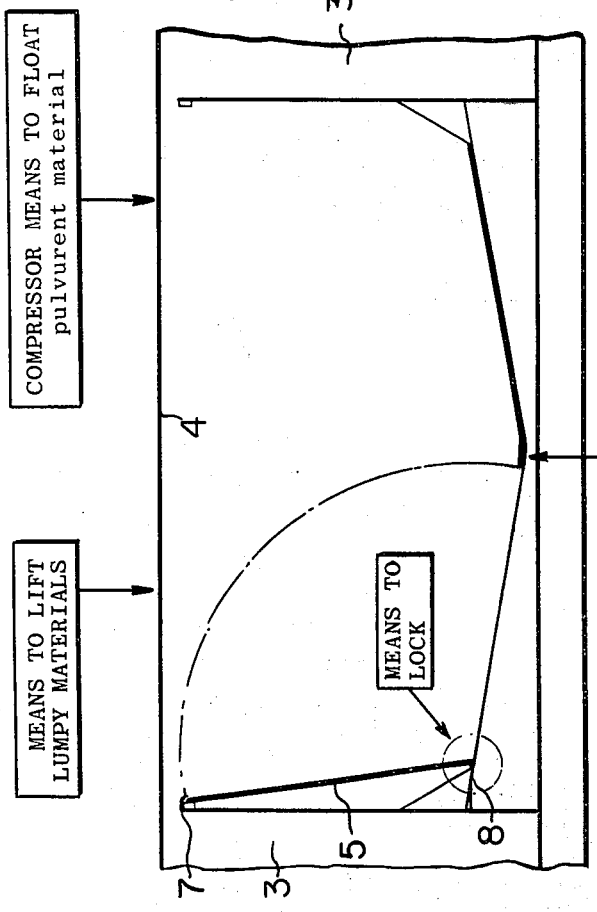

MARINE UNLOADING AND LOADING SYSTEM OF POWDERED AND LUMPY BULK MATERIALS FOR HOLDS WITH A PNEUMATIC DISCHARGE DEVICE

FIELD OF THE INVENTION

The invention relates to a pneumatic discharge device such as for holds of ships, barges and similar conveyors, consisting of large-area loosening units, so called panels, arranged along the fold bottom, with open air conveyer chutes as feeders to pneumatic conveyer units for advancing the bulk material.

DESCRIPTION OF THE PRIOR ART

Special cement ships are provided with automatic discharge devices with pneumatic conveyer units for the transportation of bulk cement from the folds of large-area loosening units, called "panels" in connection with open air conveyer chutes. The panels are sheet metal cases which are covered on the top side with a thick tissue penetrable by air. The air compressed by compressor means such as a ventilator or blower, enters the powdered cargo through the penetrable tissue, and decreases the friction between the individual powdered particles to such an extent that the powdered material flows like water. Since this involves a gravitational conveyance, panels and air conveyer chutes are installed in a slanting manner in order to initiate the flowing of the material.

The required inclination depends on the kind of conveying material and on the kind of ventilation. The inclination of the loosening units, as well as the air quantity and air pressure, are determined on the basis of experiences and tests.

The special ships are suitable only for the transportation of powdered material which is discharged by means of the pneumatic conveyer units. A loading with lumpy material and an unloading thereof by means of the prior art gripping devices is not feasible, because during loading and unloading of holds provided with rigid panels and air conveyer chutes these loosening units can be damaged by the cargo and particularly by the gripping device.

Therefore the prior art employs ships with different cargo hold for handling lumpy bulk material.

The prior art is represented by U.S. Pat. Nos.:
3,232,366 Feb. 1, 1966, C. S. Cockerell,
3,385,635 May 28, 1968, H. W. Carlsen,
3,841,501 Oct. 15, 1974, W. J. V. Heist,
1,020,566, British, published Feb. 23, 1966.

In order to provide for holds that are suitable for conveying powdered cargo so-called ventilation mats instead of rigidly installed panels and air conveyer chutes may be employed. Such mats are made of tissue which is penetrable by air on the top side, and impermeable to air on the bottom side and they are divided into individual air chambers. The mats are spread over the bottom of the hold of the ship. When, however, instead of powdered material lumpy material is to be conveyed pneumatically for loading and unloading by gripping devices, the ventilation mats must be cleaned, rolled up, separated from their air feed lines, and stored outside the hold and the durability of the ventilation mats suffers from the corresponding stresses.

SUMMARY OF THE INVENTION

In order to avoid this waste of energy, labor and time the invention provides a pneumatic discharge device for holds capable of handling both, powdered and lumpy cargo, which makes it possible to prepare the holds in the shortest time possible for pneumatic transportation of powdered material including flotation means as well as transform the holds for the mechanical transloading of lumpy cargo.

Thus the objects of the invention are to provide:

a device of a unilaterally flexible construction of the panels and of the open air conveyer chutes arranged along the hold bottom of a ship, so that they can be folded upward by means of drawing devices whether operated manually or motor-driven;

a device, by which panels may be folded upward individually or in groups of several panels;

a device, in which the loosening units in the folded-up state are locked on the vertical hold wall and thus release the fold bottom for the placement of lumpy cargo;

a device, in one embodiment of which the panels and the air conveyer chutes are provided at the bottom side with reinforced metal sheets and additional reinforcing ribs to protect the loosening units in the folded-up state from being damaged by the gripping device operation;

a device, in a preferred embodiment of which the panels as well as the open air conveyer chutes are provided, at their bottom side, with a steel reinforcement construction whereby the panels and the air conveyer chutes are detachably fastened thereto or thereon to make it possible to detach individual panels easily from the reinforcement construction, f.i. for repair purposes and to make the loosening units structurally independent of the substructure for their reliable protection;

a device having the hinge of the panels and of the air conveyer chutes in each case located near the vertical hold walls with one or more panels, depending on the type of construction with or without a special protective structure, supported by bearing blocks with the aid of bolts or pipes, with the impact point for the cable line of the hand or motor winch, by means of which the panels are folded up against the hold wall, located on the side of the panels that faces the hinge and a device requiring only one winch to fold up several panels or panel groups of guide pulleys.

The drawing means may be positioned outside the hold.

The open air conveyer chute which in the prior art is positioned in the center of a hold, likewise is provided, near the wall of the hold, with a hinge and can be folded up like the panels with the aid of the drawing means.

The panels and the air conveyer chutes are secured by locking means in the folded-up state.

When according to one embodiment of the invention the air feed lines for the panels, and the open air conveyer chutes are constructed in the hinge area, as flexible, engageable lines consequently the air feed connection is monitored by the crew.

When according to another embodiment of the invention the air feed lines for the panels and the air conveyer chutes are constructed in the hinge area as hinge point, the air feed line need not be disengaged when the loosening units are being folded up.

Other objects and advantages of the invention will become apparent to those skilled in the art from the following description thereof and claims in conjunction with the appended drawings.

BRIEF DESCRIPTION OF THE DRAWINGS

In the drawings which illustrate the pneumatic discharge device for holds according to the invention diagrammatically, there are shown:

In FIG. 1, a longitudinal section through a hold of a ship.

In FIG. 2, a plan view upon a portion of the hold of FIG. 1.

In FIG. 3, an enlarged detail on FIG. 1, and in FIG. 4, a plan view upon the panels modified in the hinge area with portions cut off.

DESCRIPTION OF THE PREFERRED EMBODIMENTS

In the longitudinal section according to FIG. 1, the hold bottom has slopes 2, vertical hold walls 3 and on top a ceiling 4. In the right half of FIGS. 1 and 2 the loosening units or panels 5 are shown in the hinged-down state. In the same manner as panels 5, the open air conveyer chute 6 is shown positioned in the center on the bottom of the hold. In the left portion of FIGS. 1 and 2, the panels 5 are shown folded up and are locked at locking means 7 on the vertical hold wall 3. The hinge point of the panels is at panel hinge means 8, while the hinge point of the air conveyer chute 6 is arranged at chute hinge means 9 on the lateral hold wall as shown on FIG. 2.

As shown on FIG. 3, the panels 5 are detachably fastened relative to a support and protective means 10. The support and protective construction is made so stable that in the folded up position indicated in dash and dot lines the impact of the gripping device on the inside steel bottom side of the protective construction does not cause any damage. This bottom side is supported in the rear by spaced reinforcing ribs 17.

The air feed line 11 which, as shown on FIG. 3, is held in a stationary position on wall 3, is provided with a flexible engageable conduit 12, connected with the air feed pipe connection 13 of panel 5. Before the panel is folded up, the flexible line is disengaged.

The hinge joint 14 of the panel is constructed preferably in such a manner that the panel is provided with ring-shaped brackets for holding a bearing pin which is arranged on both sides in the bearing positioned on bearing blocks.

As shown on FIG. 2 in each case five panels form a unit which can be folded up jointly. In this structure each panel has a separate air feed line.

As shown on FIG. 4 instead of flexible, engageable air feed lines for panels and air conveyer chutes, hinge joints 15 are provided in the interior of the feed lines with a packing.

The open-air conveyer chutes 6, which can be folded up, may also be provided with a protective bottom-side structure analogous to that described above with relation to the panels.

Holds with panels and air conveyer chutes for pneumatic transportation of powdered material, and the subsequent pneumatic advance per se are known to the art.

With the aid of the panels inclined toward the center and the conveyer chutes in operative position the powdered material is fed to the open-air conveyer chute. The air conveyer chute then advances the powdered material by way of a proportioning element, e.g. to a pneumatic powder-conveying pump located in the longitudinal center tunnel of the ship, by means of which pump the powdered material is fed f.i. to a silo positioned on land.

With the same panels and conveyer chutes out of the way by means of the constructions of the present invention lumpy bulk material can be handled with the same ease.

The system is applicable also to bins and similar type material holding devices.

What is claimed is:

1. In a marine loading system of powdered bulk materials and also lumpy materials for ships, barges and similar transport vehicles having large rectangular cargo holds with a ceiling and conventional means to load and unload lumpy materials, a pneumatic discharge means of powdered materials comprising:

powdered materials air flotation means and open-air conveyer chutes connected to said pneumatic discharge means for advancing said powdered material, said flotation means and said chutes located at the bottom of said hold, foldably attached thereto, and means to fold said floatation means and conveyer chutes upwardly out of the loading way of said hold to allow for loading or unloading of said lumpy materials.

2. A pneumatic discharge device for holds as claimed in claim 1, said flotation means comprising:

at least one large-area loosening panel with at least one chute, arranged along the bottom of the hold in the unfolded position;

said panel and chute being unilaterally flexible; and said means to fold said panel and chute is a lifting means.

3. A pneumatic discharge device as claimed in claim 1, said panel and said chute being provided on their bottom sides with reinforcements.

4. A pneumatic discharge device as claimed in claim 2, said air flotation means including:

at least one air-feeder line for said at least one panel, said line having a flexible portion so it can fold with its associated panel;

said means to fold including hinged means for said chute and panel.

5. A pneumatic discharge device as claimed in claim 2, said air-flotation means having at least one air-feeder line for said at least one panel;

said air-feeder line and said open-air conveyer chute being constructed in their hinge areas as hinge joints.

6. A pneumatic discharge device as claimed in claim 1, said flotation means comprising a plurality of panels and chutes attached detachably to the bottom of the hold alongside its vertical wall by hinges.

7. A pneumatic discharge device as claimed in claim 1, said flotation means comprising a plurality of panels and chutes attached detachably to the bottom of the hold alongside its vertical walls by flexible portions.

8. A pneumatic discharge device as claimed in claim 1, and means to lock said pneumatic discharge means in its folded-up position alongside the vertical walls of said hold.

* * * * *